United States Patent [19]

Robinson et al.

[11] 3,930,165

[45] Dec. 30, 1975

[54] CASSETTE

[75] Inventors: Alfred Robinson; Joseph S. Schatz, both of Brooklyn, N.Y.; Leonhard Katz, Winchester, Mass.

[73] Assignee: U. S. Radium Corporation, Morristown, N.J.

[22] Filed: Oct. 21, 1974

[21] Appl. No.: 516,490

[52] U.S. Cl. .............................................. 250/480
[51] Int. Cl.² ......................................... G01N 21/34
[58] Field of Search ........................... 250/468, 480

[56] References Cited
UNITED STATES PATENTS
3,870,889  3/1975  Schmidt............................. 250/480

Primary Examiner—James W. Lawrence
Assistant Examiner—T. N. Grigsby
Attorney, Agent, or Firm—Pennie & Edmonds

[57] ABSTRACT

A film cassette for daylight handling of X-ray film. The cassette includes a flat, thin profiled housing with an opening along one edge through which film sheets may be inserted and removed. Internally of the housing are opposed intensifying screens, one of which is movable away from the other to permit insertion and removal of the X-ray film sheets. A plate member having a lifting mechanism cooperates with the movable intensifying screen to urge it against the other intensifying screen when a film sheet is in place in the cassette and is operable to separate the intensifying screen to permit removal of the X-ray film sheet after exposure and insertion of a new sheet.

13 Claims, 5 Drawing Figures

CASSETTE

BACKGROUND OF THE INVENTION

In handling of X-ray film to be used, for example, in connection with taking X-ray pictures of patients, it is normally necessary to load the film into a film cassette while in a darkroom. Also, after the picture of the patient is taken, removal of the film from the cassette must be done in a darkroom. This is not only a cumbersome procedure but requires that special darkroom facilities be provided.

More recently, film dispensing and processing equipment has been proposed wherein the cassette for holding the film may be inserted into the equipment and the film automatically placed in the cassette or removed therefrom. Such equipment is intended for the daylight handling of film; and for this purpose, the film cassettes have been specially constructed. Film handling equipment and cassettes of the type permitting daylight handling of the film are described, for example, in U.S. Pat. No. 3,790,160.

One important and essential criteria of film holding cassettes is their ability to properly hold the X-ray film sheet flat against the intensifying screens disposed on opposite sides of the film. Prior art types of cassettes constructed for darkroom handling of film generally have one side which is hinged along an edge of the cassette and openable like a door. Cassettes of this type can be made with internal pressure plates which will assure proper holding of the X-ray film sheet in intimate pressure contact with the opposed intensifying screens over the entire surface of the film sheet. Also, with the door type cover, there is no problem in separating the intensifying screens to permit access to and removal of the X-ray film sheet. This is easily made possible by having one of the intensifying screens on the inner wall surface of the hinged door member of the cassette.

With cassettes constructued for daylight handling of film by automatic dispensing and processing equipment, it is desirable to construct the cassette so that it may be opened when in the dispensing or processing apparatus with a minimun of effort and in a minimum amount of space. To achieve this purpose, thin profiled cassettes have been proposed without the normal pivoting door and with simply an opening along one edge of the cassette housing which is adapted to be opened and closed upon actuation of structure disposed internally of the cassette housing. With cassettes of this type, difficulties arise with respect to assuring that the X-ray film sheet is properly pressed between the intensifying screens over the entire surface area of the sheet while at the same time assuring adequate and positive separation of the intensifying screens to permit removal and insertion of X-ray film sheets.

Presently proposed cassettes, as for example, described in the above-mentioned patent, generally have the mechanism employed for effecting separation of the screens and/or holding of the screens in pressure contact with the film sheet located along the edges of the intensifying screen which is to be moved. This is disadvantageous as far as the holding and separating functions of the intensifying screens is concerned in that there is no positive control of the central body portion of the movable screen which may be bend or sag and otherwise not move in direct response to movement of the screen edges. The larger the screen is in surface area, the more pronounced this bending or sagging tendency will be. Also, cassettes having this profiles, leave little room for separation of the intensifying screens; and if the central portion of the movable screen bends or sags when the edges are lifted a distance sufficient to permit insertion or removal of film sheets, this can easily interfere with the proper operation of the cassette.

SUMMARY OF THE INVENTION

In accordance with the teaching of the present invention, applicants' film cassette is constructed with an intensifying screen which is movable toward and away from the other intensifying screen of the cassette in such a way that movement of all portions of the screen is controlled. More particularly, movement of the intensifying screen is effected by a first set of lifting fingers engaging with a cooperating second set of fingers disposed at spaced locations over the entire surface area of the intensifying screen. This produces a lifting force which is both positive and spread uniformly across the entire screen surface area. The first set of fingers is disposed on a separate slidable plate overlying the movable intensifying screen. Sliding of the plate between first and second positions effects cooperating actuation of the lifting fingers to produce the lifting force necessary to raise the one intensifying screen away from the other. Sliding movement of the plate to produce this result can be achieved from a point externally of the cassette by suitable mechanism included within a film dispensing and processing apparatus. With the present invention, a positive lifting of the one intensifying screen from the other can be assured regardless of the size of the cassette. Also, there is no possibility of undesirable central bending or sagging of the intensifying screen as it is lifted.

In addition to the positive and even lifting of the one intensifying screen from the other, the cassette of the present invention is provided with spring means for assuring pressure contact of the entire film by the opposed intensifying screens when the film is in place. In accordance with the teachings of the present invention, the spring means is positioned on the plate overlying the movable intensifying screen and engages the opposed surface of the movable screen. This screen, in turn, has raised seating surfaces cooperating with the spring means. The construction of the spring means and cooperating seating surfaces is such whereby a force is exerted over the entire surface of the movable screen urging it toward the other screen. This force, however, is removed and becomes inoperative during the separating of the screens from each other thereby avoiding any possible interference with the separating action.

A DESCRIPTION OF THE PREFERRED EMBODIMENT

Figure 1:
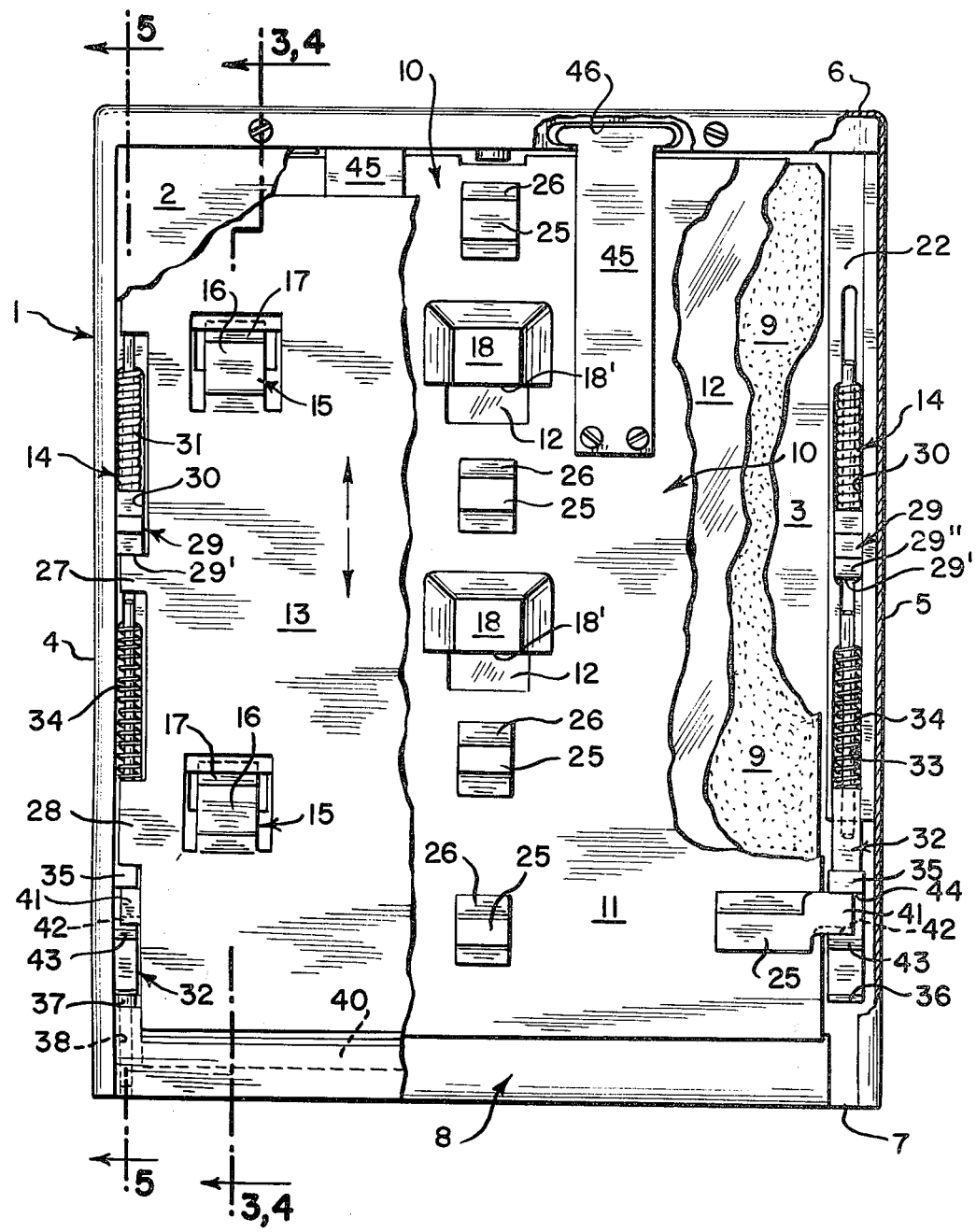
FIG. 1 is a plan view of the cassette with parts broken away to show the internal construction.

With reference to FIG. 1, it will be seen that the cassette includes a flat housing 1 having a front wall 2, a back wall 3, side edge walls 4 and 5, back edge wall 6 and a front edge wall 7 containing an opening 8.

Internally of the housing disposed and along the back wall thereof, a first intensifying screen means 9 is secured. A second, movable intesifying screen means 10 is disposed in overlying relation with the first intensifying screen. This second screen means includes a plate member 11 to the undersurface of which is secured an intesifying scree 12 adapted to be disposed in opposed facing relation to the first screen.

Disposed above the movable screen means is lifting plate member 13. This plate cooperates with the second intensifying screen to effect movement toward and away from the first intensifying screen as more fully described below. Actuating mechanism is provide for controlling movement of the lifting plate. This actuating mechanism is generally designated in FIG. 1 by reference numeral 14; and as there shown, is disposed between the side walls 4 and 5 of the cassette and the adjacent side edges of the second intensifying screen means and lifting plate means.

Figure 2:
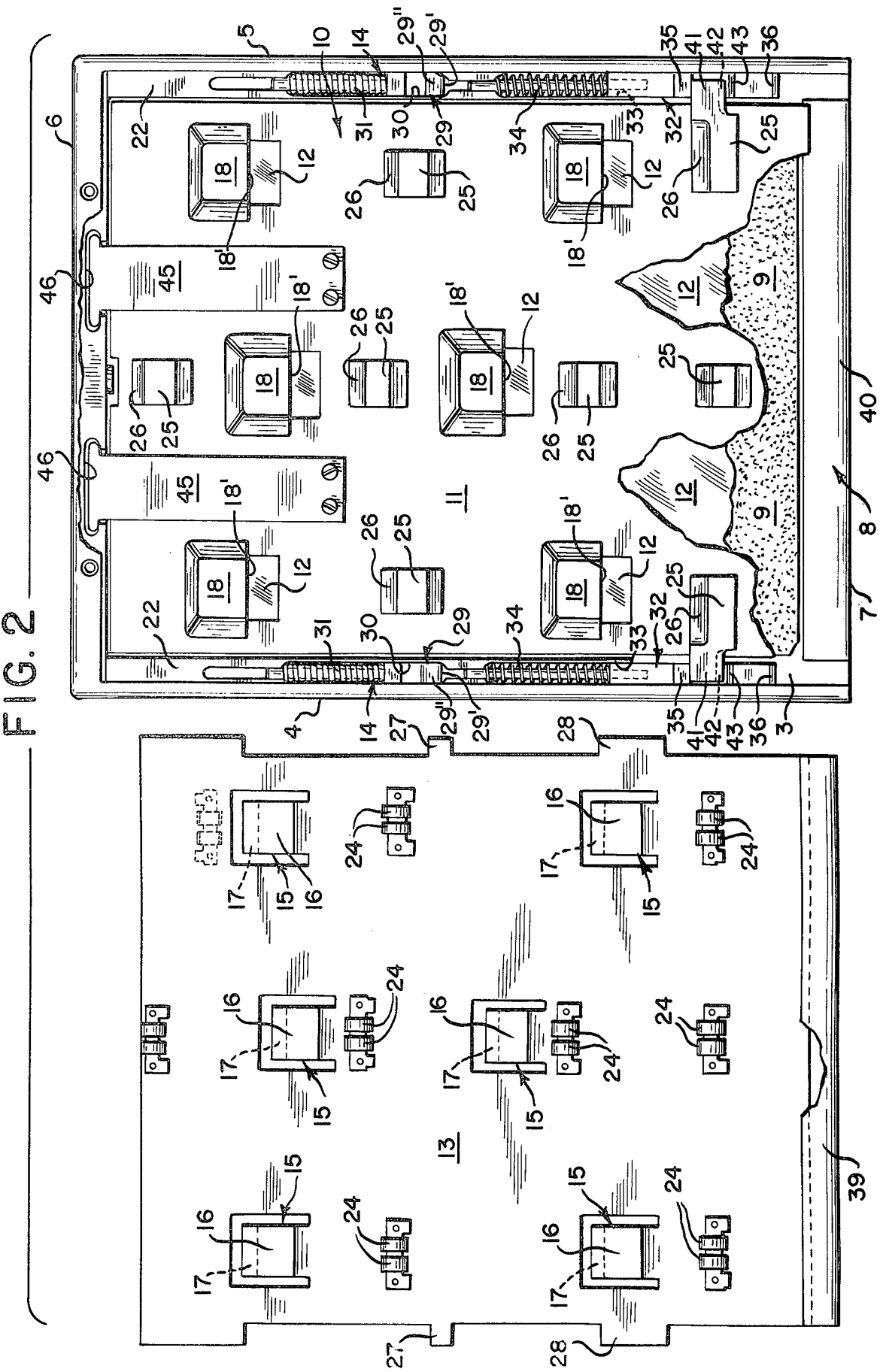
FIG. 2 is a plan view of the cassette with the cover removed and with the lifting plate turned over.
Figure 3:
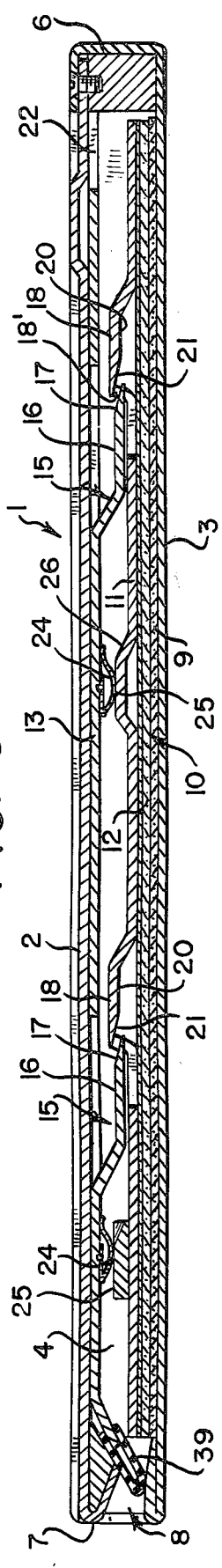
FIG. 3 is a cross-sectional view taken along lines 3—3 of FIG. 1 with the cassette in closed position.

Referring to FIGS. 2 and 3, the lifting plate includes a plurality of fingers 15 located at spaced positions over the entire surface of the lifting plate. These fingers, which can be stamped from the plate, which is made of metal or other material suitable for stamping, extend away from the general plane of the plate and toward the underlying intensifying screen means 10. Each finger has a lifting surface 16 having a portion 17 inclined in a plane extending obliquely to the plate. The fingers of the lifting plate are adapted to align and cooperate with similar fingers 18 on the opposed surface on the underlying plate 11 of the screen means 10.

As shown in FIG. 2, the fingers 18 are spaced over the entire surface of the screen means 10. In construction they are formed by a stamping operation in the plate 11 which itself is made of aluminum or other suitable rigid material. The fingers 18 are cut away along one edge 18' as opposed to the fingers 15 of the lifting plate which are cut away along three edges. Immediately in front of each finger 18 is a cutout in the plate 11. The cutout permits sliding of the fingers 15 of the lifting plate under the fingers 18. The lifting fingers 18 include lifting surfaces 20; and as shown in FIG. 3, these lifting surfaces are provided with a portion 21 which is inclined in a plane extending obliquely to the screen means 10. As will be seen from FIGS. 3 and 4, the lifting surfaces 16 of the fingers 15 face away from the intensifying screen means 10 while the lifting surfaces 20 of the fingers 18 face away from the overlying lifting plate 13.

The lifting plate is mounted in the housing on side support structure 22 at a fixed distance from the first intensifying screen 9. Although fixed in elevation within the cassettes, the lifting plate is slidable along the support structure 22 toward and away from the edge wall 7 of the cassette containing the opening 8.

With this construction, the cooperating fingers on the lifting plate and movable screen means function to raise the latter away from the underlying intensifying screen 9 as the lifting plate is slid from a first position adjacent the opening 8 to a second position spaced from the opening. The inclined portions 17, 21 of the lifting surfaces 16, 20, which extend in the direction of sliding movement of the lifting plate, facilitate smooth engagement of the lifting surfaces of the fingers.

When the lifting plate is in the position adjacent the opening 8, the cassette is closed. This position is shown in FIG. 3 and it will be seen that the inclined portions of the lifting surfaces partially oppose each other. When the lifting plate is moved away from the opening 8, the cassette is in opened position, this being shown in FIG. 4. In this latter position, the fingers of the lifting plate positively hold the underlying intensifying screen means 10 spaced from the intensifying screen 9 over the entire surface area of the two screens.

In addition to providing a uniform lifting force for the movable screen, the cassette of the present invention includes spring means assuring proper holding of film sheets between the intensifying screens when the cassette is in closed position. More particularly, spring means in the form of separate springs are positioned at spaced locations across the surface of the lifting plate which faces the underlying screen means 10. In construction, the springs are made of flexible spring metal having curved compressible surfaces 24. These surfaces cooperate with raised seating surfaces 26 on the plate 11 of the intensifying screen means 10. When the cassette is in the closed position as shown in FIG. 3, the springs engage against the seating surfaces 25 to resiliently urge the intensifying screen means 19 toward the intensifying screen 9. When an X-ray film is disposed between the two intensifying screens, this construction provides a force over the entire surface of the intensifying screen means 10 assuring that the X-ray film sheet is properly held flat and in contact over its entire area with both intensifying screens.

Figure 4:
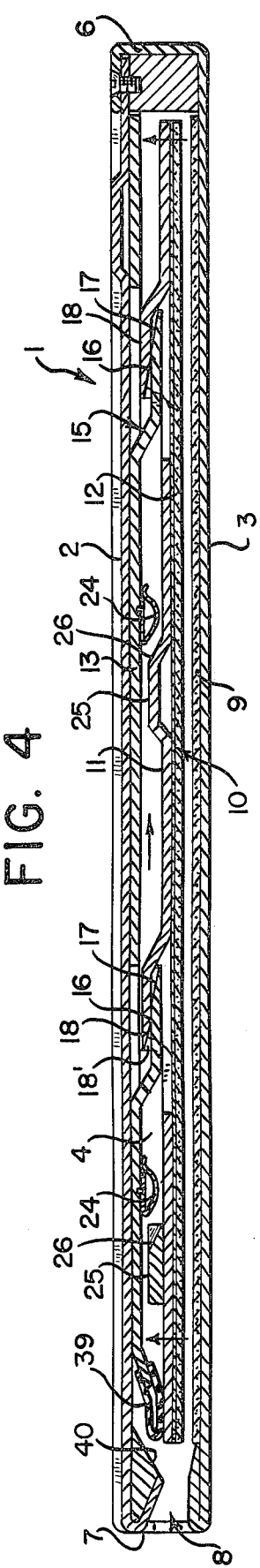
FIG. 4 is a cross-sectional view taken along lines 4—4 of FIG. 1 with the cassette in opened position.

Reference to FIGS. 3 and 4 shows that the springs 24 function to urge the intensifying screens together only when the cassette is in closed position. When the cassette is in the opened position, the springs are moved out of alignment with the seating surfaces 25 as clearly indicated in FIG. 4. With this construction, the springs do not interfere with the lifting force exerted on the intensifying screen means 10 to move it away from the intensifying screen 9. To facilitate proper engagement of the springs with the seating surfaces 25 during closing movement, the seating surfaces are provided with inclined surfaces 26. The curved surfaces 24 of the springs ride along these inclined surfaces when moving onto and off of the seating surfaces.

Figure 5:
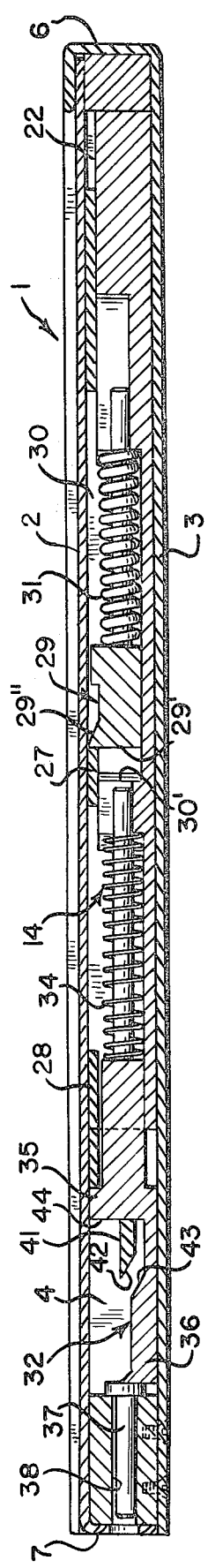
FIG. 5 is a cross-sectional view taken along lines 5—5 of FIG. 1.

Sliding movement of the lifting plate is controlled by engagement with the actuating mechanism 14 disposed adjacent the side edge walls 4 and 5 of the cassette. For this purpose, the lifting plate includes side wing means 27 and 28 extending laterally beyond the side edges of the plate in a direction generally perpendicular to the direction of sliding movement of the plate. These side wings engage with the actuating mechanism 14. More particularly, the side wings 27 engage a first spring actuated pair of plungers 29. These plungers are slidably mouned in tracks 30 along the sides of the cassette and are urged by springs 31 toward the front edge 7 of the cassette. Reference to FIG. 5 shows that the plungers 29 have a front surface 29' which makes contact with the wings 27. The plungers 29 continually urge the lifting plate toward the opening 8 of the cassette and into the position closing the cassette.

The plungers also have inclined positions 29'' for facilitating assembly of the cassette; that is, the lifting plate can simply be placed in position over the plungers 29 when the latter are in their fully extended position abutting the seat 30' in the track 30. It is then only necessary to move the plungers 29 toward the back edge wall of the cassette with the inclined portions 29" riding under the wings 27. Once the plungers are backed up sufficiently, the plate can be pressed down onto the support structure 22 with the wings 27 in front of the plungers 29. This position of the elements is shown in FIG. 5.

In addition to the plungers 29, a second pair of plungers 32 are provided for sliding the lifting plate away from the opening 8 of the cassette and into the position opening the cassette as shown in FIG. 4. These plungers are slidably mounted in tracks 33 and are biased by springs 34 toward the opening of the cassette. The plungers 32 include abutments 35 engaging the wings 28 of the lifting plate. The forwardmost ends 36 of the plungers 32 are positioned in alignment with actuating pins 37 extending into access openings 38 in th front edge wall of the cassette. Engagement with the pins 37 can be made by suitable mechanism in the dispensing and processing equipment with which the cassette is adapted to be used. It will be evident from the above that pushing of the pins 37 inwardly will move the lifting plate from its cassette closing position to a position openings the cassette. This movement will be against the force of the springs 31 of the rear pair of plungers 29. Removal of the force acting on the pins will permit the springs 31 to return the lifting plate to its cassette closing while at the same time the springs 34 will return the plungers 32 to their original position.

When the lifting plate is located adjacent the opening 8 of the cassette, a sealing strip 39 on the front edge of the plate assures that the cassette openings 8 is closed. This prevents removal of any film sheet contained in the cassette and prevents ingress of light. The sealing strip is made of flexible material, such as rubber, and extends beyond the front edge of the lifting plate in normally spaced relation above the bottom wall of the cassette. As shown in FIG. 4, however, the front edge wall 7 of the cassette is provided with an inclined portion 40 overlying the opening 8 and disposed in the path of sliding movement of the lifting plate. Therefore, when the plate is moved toward the opening 8, the sealing strip engages this inclined portion 40 and is deflected downwardly across the opening to effectively close and seal the cassette.

In addition to the lifting fingers 18 on the body portion of the intensifying screen means 10, side fingers 41 are provided. These fingers extend laterally beyond the side edges of the screen means 10 in a direction generally perpendicular to the direction of sliding movement of the lifting plate 10. Lifting surfaces 42 are provided on the fingers 41 and face in the same direction as the lifting surfaces of the fingers 18. The plungers 32 of the actuating means 14 include lifting surfaces 43 underlying and cooperating with the lifting surfaces 42 of the side fingers 41. These lifting surfaces 42 and 43 cooperate with each other in the same manner as the lifting surfaces of the fingers 15 and 18. However, instead of pulling the intensifying screen means 10 away from the other screen 9, they function to push on the screen means 10 and assist in the positive separation of these screen means.

It will be seen from FIG. 5 that the plungers 32 include surfaces 44 which engage against the side fingers 41. The plungers are thereby locked in position in the cassette. This engagement, however, tends to urge the intensifying screen means 10 out the opening 8 of the cassette. To prevent this, the intensifying screen means is provided with locking member 45 which engage in slots 46 at the closed back edge wall 6 of the cassette. By this construction, the screen means 10 is also prevented from sliding during actuation of the lifting plate. Further, with the side edges of the screen means 10 disposed along the inner sides of the tracks 30 and 33, the screen means is neatly held against all movement except movement in a direction toward and away from the underlying screen 9.

The above description has been made of the presently preferred embodiment of the cassette. However, it is to be understood that modifications can be made thereto without departing from the scope of the invention. For example, the fingers 18 can have the same construction as the fingers 15; or alternatively, the finger construction of the lifting plate can be used on the intensifying screen means 10 while that on the intensifying screen means can be used on the lifting plate. Further, the raised surfaces of the lifting fingers 18 on the intensifying screen means can function as seating surfaces for the springs 24. For this type of construction, the springs would simply be placed in front of each of the fingers 15 and shown in dotted lines in FIG. 2.

We claim:

1. In a film cassette having a front and back wall and edge walls connecting three edges of the front and back walls together leaving an opening at one edge wall, first intensifying screen means disposed adjacent the inner surface of said back wall, second intensifying screen means disposed in opposed facing relation to said first screen means, and means for mounting said second screen means for movement toward and away from said first screen means, the improvement comprising:
    a. plate means disposed between the second screen means and the front wall;
    b. means for mounting said plate means in said housing at a fixed distance from said first screen means and for sliding movement toward and away from one edge wall of the housing between first and second positions;
    c. a plurality of first fingers fixed to the surface of said plate means facing the second screen means with each finger having a lifting surface facing away from said second screen means;
    d. a plurality of second fingers fixed to the surface of said second screen means facing said plate means for cooperating with the first fingers, said second fingers each having a second lifting surface facing away from said plate means for slidably engaging said first lifting surfaces;
    e. at least one of the first and second lifting surfaces being inclined in a plane extending obliquely to said plate and second screen means and extending in the direction of sliding movement of said plate means;
    f. said first lifting surfaces being disposed relative to said second lifting surfaces to permit movement of said second screen means toward said first screen means when said plate is in said first position;
    g. said first lifting surfaces engaging said second lifting surfaces to move said second screen means away from the first screen means as said plate is slid from said first position to said second position; and
    h. means for pressing said second screen means toward said first screen means when said plate is in said first position.

2. The improvement in a film cassette according to claim 1 wherein:
   a. said last mentioned means includes spring means fixed to the opposing surface of one of said plate and second screen means; and
   b. the opposing surface of the other of said plate and second screen means includes raised seating surfaces cooperating with said spring means, said spring means and seating surfaces opposing each other when said plate is in said first position to create a force urging said second screen means toward said first screen means and being out of opposing relation when said plate is in said second position to remove the force urging said second screen means toward said frist screen means.

3. The improvement in a film cassette according to claim 2 wherein:
   a. said spring means comprises a plurality of separate springs each having a curved compressible surface facing the cooperating seating surfaces; and
   b. each of said seating surfaces includes an inclined portion extending in the direction of sliding movement of said plate means and along which said springs slide as said plate is moved from said first to said second positions to compress the springs.

4. The improvement in a film cassette according to claim 3 wherein:
   a. the seating surfaces for the spring means are located at positions spaced from the fingers.

5. The improvement in a film cassette according to claim 4 wherein:
   a. the springs are fixed to the plate means at positions spaced from the finger on said plate means for cooperation with seating surfaces disposed on the second screen means.

6. The improvement in a film cassette according to claim 3 wherein:
   a. the seating surfaces for the spring means are defined by the surfaces of the fingers on one of said plate and second screen means which face the cooperative fingers.

7. The improvement in a film cassette according to claim 3 wherein:
   a. all of said lifting surfaces are inclined in planes extending obliquely to the plate and second screen means; and
   b. said lifting surfaces oppose each other, at least to some extent, when the plate means is in said first position.

8. The improvement in a film cassette according to claim 3 further including:
   a. second spring means for urging the plate means toward the first position; and
   b. actuator means accessible from the exterior of the cassette for moving the plate means toward the second position.

9. The improvement in a film cassette according to claim 8 wherein:
   a. the second fingers fixed to the second screen means include side fingers extending laterally beyond the side edges of the second screen means in a direction generally perpendicular to the direction of sliding movement of the plate means, said side fingers having lifting surfaces facing away from said plate means;
   b. said actuating means is disposed between the side fingers and the back wall of the cassette; and
   c. said actuating means includes third lifting surfaces facing in the same direction as the lifting surfaces of the first lifting fingers on the plate means for engaging the lifting surfaces of the side fingers in the same manner as said first and second lifting surfaces.

10. The improvement in a film cassette according to claim 8 wherein:
    a. said plate means includes side wing means extending laterally beyond the side edges of the plate means in a direction generally perpendicular to the direction of sliding movement of the plate means;
    b. said second spring means is disposed adjacent the side edges of the plate means for engaging said side wing means to urge the plate means toward said first position; and
    c. said actuating means is disposed adjacent the side edges of the plate means for engaging the side wing means along a surface thereof facing the edge wall having the opening 11. The improvement in a film cassette according to claim 8 wherein:
    a. said plate means is mounted for sliding movement between a first position proximate the edge wall having the opening and a second position removed from said edge wall.

12. The improvement in a film cassette according to claim 10 further comprising:
    a. light seal means fixed to the plate means adjacent the edge wall having the opening for closing the opening when said plate is in the first position.

13. The improvement in a film cassette according to claim 12 wherein:
    a. the light seal means is a flexible strip of material secured across the edge of the plate means adjacent the edge wall having the opening and normally extends beyond the plate means in spaced relation to the bottom wall of the casing; and
    b. the edge wall of the cassette having nthe opening includes an inclined portion overlying said opening and in the path of sliding movement of the plate means and the light seal thereon for deflecting the light seal downwardly across said opening as the plate moves to said first position.

* * * * *

UNITED STATES PATENT AND TRADEMARK OFFICE
CERTIFICATE OF CORRECTION

PATENT NO. : 3,930,165
DATED : December 30, 1975
INVENTOR(S) : Alfred Robinson, Joseph S. Schatz and Leonhard Katz It is certified that error appears in the above-identified patent and that said Letters Patent are hereby corrected as shown below:

```
Column 2, line 2,   "this" should read --thin--.
Column 3, line 14,  "scree" should read -screen--;
          line 16,  "means is" should read --means is a--;
          line 17,  "member" should read --means--;
          line 18,  "movement toward" should read --movement
                    thereof toward--;
          line 20,  "provide" should read --provided--;
          line 24,  "side walls" should read --side edge walls.
Column 4, line 24,  "26" should read --25--;
          line 28,  "19" should read --10--.
Column 5, line 26,  "openings" should read --opening--;
          line 30,  "closing" should read --closing position--;
          line 34,  "openings" should read --opening--.
Column 6, line 3,   "member" should read --members--.
Column 8, line 51,  "nthe" should read --the--.
```

Signed and Sealed this

Sixth Day of July 1976

[SEAL]

Attest:

RUTH C. MASON
*Attesting Officer*

C. MARSHALL DANN
*Commissioner of Patents and Trademarks*